(No Model.) 2 Sheets—Sheet 1.
H. C. SWAN.
VEHICLE BRAKE.
No. 596,388. Patented Dec. 28, 1897.
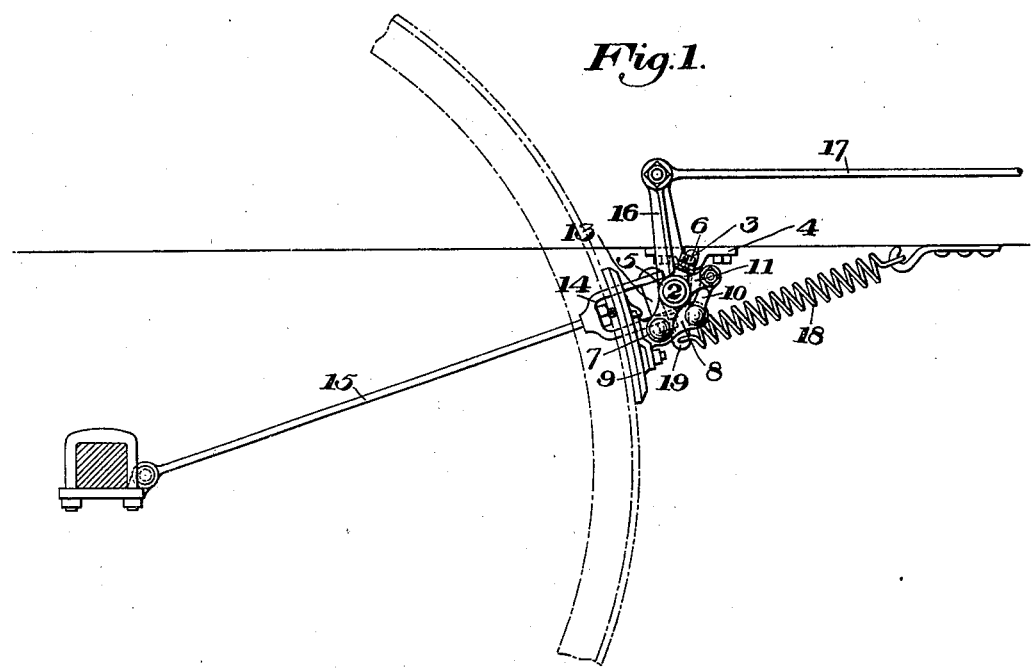
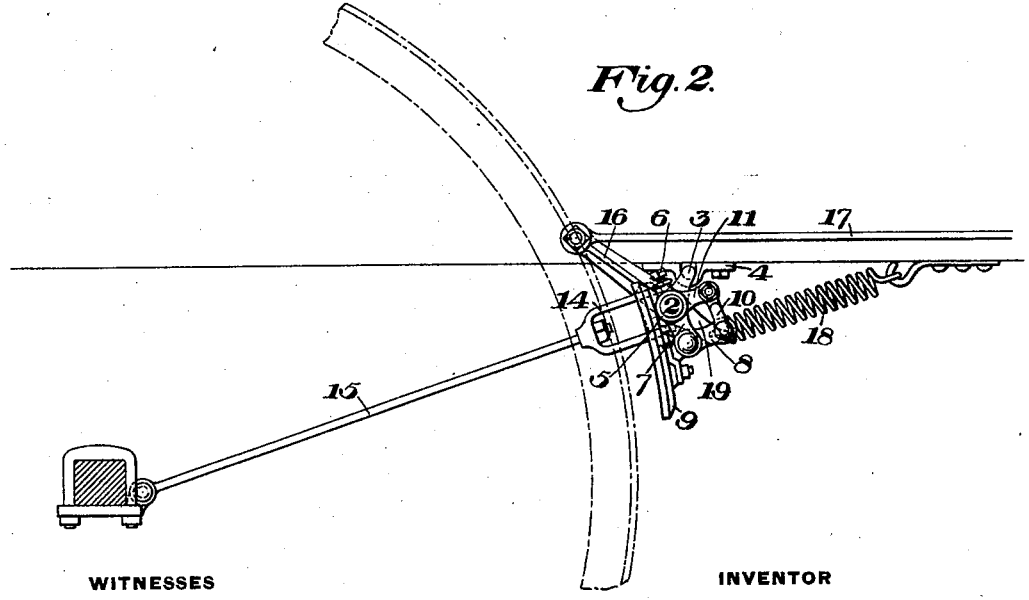
WITNESSES
INVENTOR

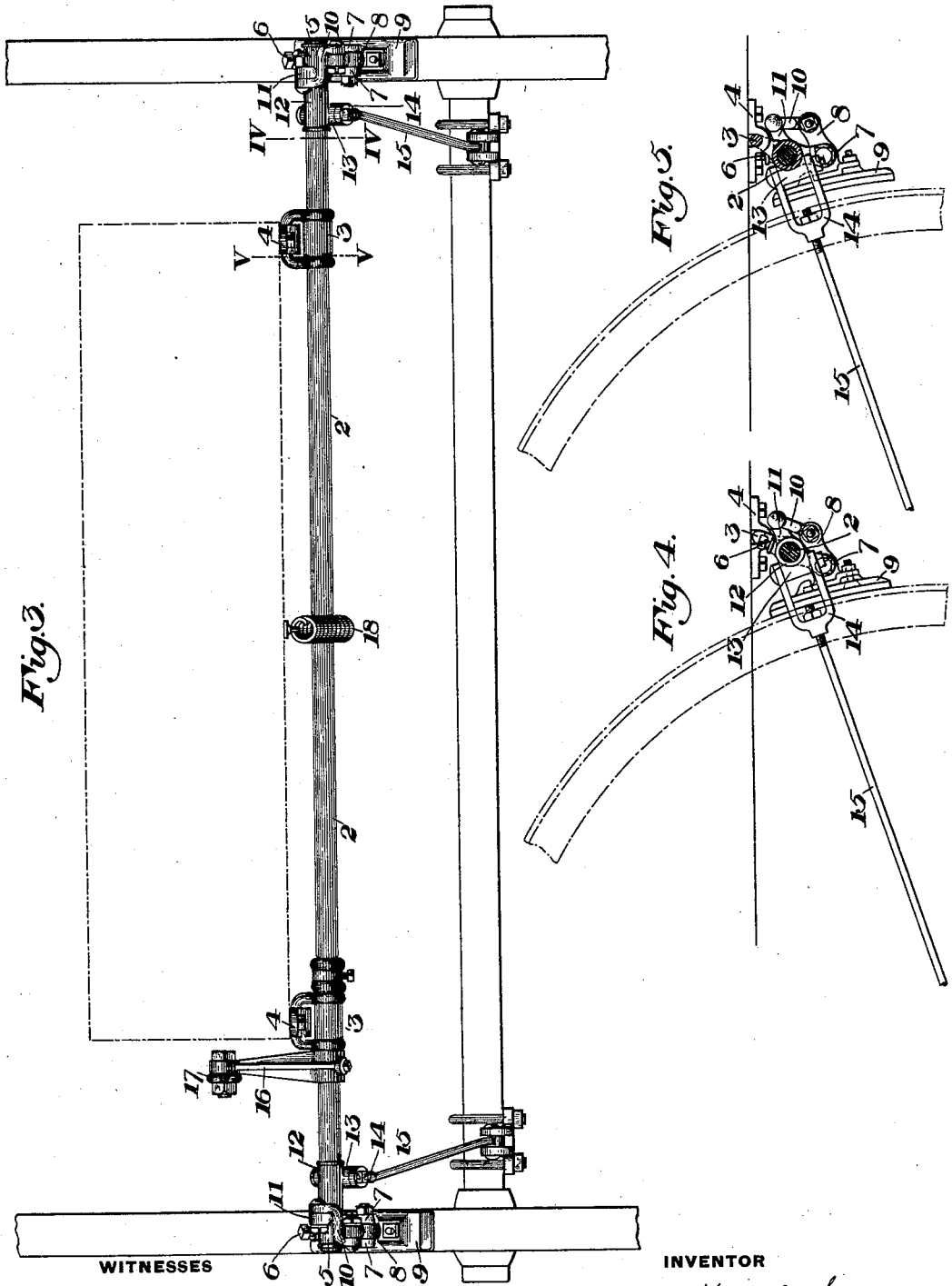

UNITED STATES PATENT OFFICE.

HENRY C. SWAN, OF OSHKOSH, WISCONSIN.

VEHICLE-BRAKE.

SPECIFICATION forming part of Letters Patent No. 596,388, dated December 28, 1897.

Application filed August 31, 1897. Serial No. 650,086. (No model.)

*To all whom it may concern:*

Be it known that I, HENRY C. SWAN, of Oshkosh, in the county of Winnebago and State of Wisconsin, have invented a new and useful Improvement in Vehicle-Brakes, of which the following is a full, clear, and exact description, reference being had to the accompanying drawings, forming part of this specification, in which—

Figure 1 is a side elevation showing my improved brake as applied to a wagon and in braking position. Fig. 2 is a similar view showing the brake withdrawn. Fig. 3 is a front elevation of the device in braking position. Fig. 4 is a section on the line IV IV of Fig. 3; and Fig. 5 is a section on the line V V of Fig. 3, the brake being partly released.

My invention relates to the brakes employed upon wagons and other vehicles and is designed to provide a brake in which all parts of the braking-surface shall move in parallelism and maintain substantially the same distance from the wheel, thus obtaining a more efficient action of the brake and a quicker release thereof.

In the drawings, 2 represents a rock-shaft supported in shackles 3, which are loosely hung within yokes 4, secured to the bottom of a wagon-body. At each end of this shaft a sleeve 5 is secured by means of a set-screw 6, each sleeve having projecting ears 7, between which is pivoted an arm 8, to the forward end of which is secured the brake-shoe 9. The rear end of this arm is connected by a curved link 10 with an arm 11, projecting from a collar 12, loosely surrounding the rock-shaft. The collar 12 is provided with a perforated lug 13, to which is secured a yoke 14, fastened at the end of the rod 15, extending to and secured upon the axle.

16 is the usual rocker-arm, from which the operating-rod 17 extends to the usual hand or foot lever worked by the operator.

18 is a coiled spring secured at one end to the wagon-body and at its other end to an arm 19, projecting from the rock-shaft.

It is evident that the rod 15 serves not only as a draft-rod, but also prevents rotation of the sleeve 12 about the rock-shaft, the shackles 10 preventing any longitudinal movement of the sleeves 12.

With the construction described when the rock-shaft is oscillated by the operator the brake will be moved toward or from the wheel in parallel lines on account of the link connections shown. The spring is intended to give a quick release when the pressure from the hand or foot lever is removed and also to force the upper end of the brake-shoe back into contact with the end sleeve 5, as shown in Fig. 2. A tension is thus brought upon the several joints, which prevents rattling of the parts when the brake is not in use.

The advantages of my invention result from the parallel movements of the brake-shoe, thus giving greater efficiency and quicker release, and also from the fact that I employ very short crank-arms for the brakes, by reason of the link connections. In the ordinary brake the crank must be long enough so that the top end of the brake-shoe will come below the center of the rock-shaft. These long cranks involve a considerable loss of power and produce lost motion, in consequence of the tendency to throw the vehicle-body forward, this body being ordinarily mounted upon springs. By shortening these cranks I am able to greatly increase the power of the brake.

Many changes may be made in the form and arrangement of the parts without departing from my invention.

What I claim is—

1. In a vehicle-brake a rock-shaft, loose sleeves surrounding the shaft, means for preventing rotation of said sleeves, and connections between the sleeves and the brake arranged to give said brake a parallel movement.

2. In a vehicle-brake, the combination with a rock-shaft, having projecting lugs, of brake-shoes having arms pivotally connected with said lugs, loose sleeves surrounding the rock-shaft and held against rotation, and link connections between the loose sleeves and the brake-shoe arms.

3. In a vehicle-brake, a rock-shaft having loose sleeves surrounding the same, rods connected to said sleeves and secured to the axle, and brakes having link connections with said sleeves arranged to give the brakes a parallel motion.

4. In a vehicle-brake, the combination with a rock-shaft, of an end sleeve secured thereto and having projecting ears, a brake-shoe having an arm pivoted within the ears, a collar surrounding the rock-shaft and having a rod extending to the axle, and a link connection between the loose sleeve and the brake-shoe arm.

5. In a vehicle-brake, the combination with a rock-shaft having actuating connections with the brake-shoe, of a spring connected with an arm secured to the shaft and arranged to bring a tension upon the parts when not in use, thereby preventing rattling.

6. In a vehicle-brake, the combination with a rock-shaft, of a brake-shoe, and connections between the shaft and shoe arranged to give the said shoe a parallel movement to and from the wheel.

In testimony whereof I have hereunto set my hand.

HENRY C. SWAN.

Witnesses:
S. T. BERRY,
EMIL W. JAITE.